Patented Dec. 15, 1936

2,064,763

UNITED STATES PATENT OFFICE 2,064,763

RUBBER DERIVATIVE

Thomas C. Morris, Akron, Ohio, assignor to Wingfoot Corporation, Wilmington, Del., a corporation of Delaware No Drawing. Application April 27, 1934, Serial No. 722,816

2 Claims. (Cl. 260—1)

This invention relates to improvements in rubber derivatives. More particularly it relates to the treatment of rubber in solution with hydrochloric acid and a compound such as tin tetrachloride. It is known that halides of amphoteric metals such as tin tetrachloride react on rubber. Bruson Patent 1,846,247 describes the reaction of such halides on rubber solutions. It was thought that a paint or lacquer made from a rubber derivative produced by the method disclosed in this patent might have desirable properties. On experimentation it was found that such a product, although partially soluble in benzene, was not soluble in petroleum distillates, such as gasoline. If, however, the rubber solution is first treated with a reagent such as hydrochloric acid and then with the halide of an amphoteric metal, the product produced is soluble in gasoline and has a low solution viscosity and in every way is to be preferred for the preparation of coating compositions. Furthermore it has been found that the rubber derivative so formed constitutes a superior material for molding.

The improved rubber derivative may be formed by adding a compound such as tin tetrachloride and a hydrogen halide, e. g. hydrochloric acid, to a rubber solution and heating the solution to effect a change in the rubber. Bruson Patent 1,797,188 relates to the treatment of rubber with chlorostannic acid, chlorostannous acid, bromostannic acid and bromostannous acid. At the time this Bruson application was filed and even for a considerable period after the patent issued it was not realized that halides of amphoteric metals such as tin tetrachloride and other halides corresponding to the other acids mentioned in this patent which, when added to a solution formed by dissolving rubber in a suitable solvent (without boiling it) and made to react by the application of heat do not form as desirable a product for paints, etc. as that obtained if hydrochloric acid is added before the reaction commences. It is not evident from the disclosure of this Bruson patent that hydrochloric acid has any effect on the action of the tin tetrachloride with which it is combined and so influences the reaction of the tin tetrachloride on the rubber that the product produced has different physical properties from the product obtained without the use of hydrochloric acid.

The present invention relates to the use of halides of amphoteric metals—not halides such as tin halides which are combined with hydrogen halides to form chlorostannic acid, etc., but halides of amphoteric metals per se, (including the hydrated or partially hydrated compounds thereof) and their use in the production of products which are commercially moldable and which may be used in the production of superior coating compositions, such as lacquers, enamels, paints, etc. The hydrochloric acid and halide of an amphoteric metal may be added to the rubber solution simultaneously or at different times.

It is not clearly understood just what the effect of the hydrochloric acid is when both hydrochloric acid and tin tetrachloride are added to an unboiled solution of rubber and the solution is then boiled. No doubt the hydrochloric acid, because of the chlorine which is common to both the acid and tin tetrachloride, prevents hydrolysis of the tin tetrachloride with any water or moisture which may be present. My copending application, Serial No. 30,731, filed July 10, 1935, shows that if a rubber solution is boiled and then treated with tin tetrachloride, a like or similar change is produced in the physical properties of the product obtained. If the boiling depolymerizes the rubber the product obtained by the action of the halide of an amphoteric metal on the boiled solution may have quite a different molecular structure from the product obtained by the action of the same compound on an unboiled solution. It may be that this difference in structure makes the one compound soluble in gasoline, whereas the other is not. Very possibly the hydrochloric acid used in the present process hastens depolymerization of the rubber. It may be that hydrochloric acid first reacts on the rubber and that the tin tetrachloride reacts with the hydrochlorinated rubber produced and that the atoms in the product obtained have quite a different arrangement from that in the product obtained by causing tin tetrachloride to react directly on rubber. The presence of the hydrochloric acid may retard or inhibit oxidation of the rubber and thus cause a product suitable for commercial molding to be produced. The hydrochloric acid may merely retard the action of the tin tetrachloride on the rubber until after the rubber has been depolymerized or has been subjected to whatever physical change is caused by boiling the rubber solution. Whatever the cause, the fact is that if tin tetrachloride is added to a rubber cement and the solution is then heated the product is not soluble in gasoline, but if hydrochloric acid is added before or with the tin tetrachloride the reaction product is soluble in gasoline. If another halide of an amphoteric metal than tin tetrachloride is used in carrying out the reaction any or all of the above suggested phenomena may come into play to cause the production of a product having the same improved physical properties.

It appears that the reaction with the halide of the amphoteric metal takes place in two stages. In the first stage the halogen and metal combine with the rubber or depolymerized rubber. In the second stage the metal and halogen equivalent to that in the metal halide are split off of the rubber and apparently the carbon atoms to which the metal and halogen were attached combine, and a product less unsaturated than rubber is produced. When the reaction takes place in the presence of hydrochloric acid as here described the product contains chlorine due to the action of the hydrochloric acid on the rubber. It is soluble in gasoline and readily moldable.

The most satisfactory method of producing these halogen containing rubber derivatives on a commercial scale is to pour the reaction product of the rubber and metallic salt and hydrogen halide into a large volume of water with stirring so as to produce an emulsion in which the reacted cement is present in the discontinuous phase. On steam distilling, the solvent is volatilized and the rubber derivative precipitates in a finely divided form. A reducing agent such as sodium sulfite is advantageously added to the water to prevent oxidation of the rubber derivative. Although the chlorine-containing rubber derivative may be recovered by treatment with alcohol or in other ways, precipitation from a water-emulsion by steam distillation is described herein as being a most satisfactory process.

For example, 260 pounds of pale crêpe rubber milled to a plasticity of 300 as determined by a Williams plastometer is dissolved in 342 gallons of benzene. The solution has a moisture content of .05% water. 15.3 pounds of tin tetrachloride and 5.0 pounds of hydrochloric acid (18° Baumé) are added. The solution is heated to boiling and maintained at or near the boiling point under a reflux condenser for about five hours until the cement produced has a viscosity of about .20 to .30 minute as determined by a Gardner mobilometer. The reacted cement is poured into 600 gallons of water containing 28 pounds of sodium sulfite. The water is vigorously agitated as the cement is added. The emulsion obtained is steam-distilled and the rubber derivative precipitated as a finely divided product. This is filtered, washed and dried in a vacuum. The finely divided product is advantageously milled on a rubber mill before being molded or used in a coating composition. The milled product may be molded by heating to 240° to 320° F. using a pressure of 1,500 to 5,000 pounds per square inch. The product obtained from a reacted cement having a viscosity of .30 minute is advantageously molded at about 280° F. using a pressure of 1,500 to 2,500 pounds per square inch. The product obtained from a reacted cement having a viscosity of .20 minute may be molded at 300° F. using a pressure of about 3,000 per square inch.

To form a coating composition the milled product may be dissolved in benzene, gasoline, carbon tetrachloride or other suitable solvent, with the addition of tung oil or other drying oil, if desired, and suitable pigments or dyestuffs, etc., to form a lacquer, enamel or paint, etc.

In carrying out the reaction of a halide of an amphoteric metal on a solution of rubber, if the halide is added to the cold solution and the reaction mixture is then brought to a boil the halide of the amphoteric metal reacts rapidly on the rubber and if the concentration of the rubber in the solution is sufficiently high the whole mass gels quite rapidly. If a compound such as aqueous hydrochloric acid is added to the rubber solution in the cold before the tin tetrachloride is added and the resulting solution is then brought to a boil, the hydrochloric acid appears to prevent any reaction of the halide on the rubber, at least until after the reaction mixture has been heated for a considerable period of time. The amount of hydrochloric acid which may be used for this purpose may be varied. It appears that enough hydrochloric acid should be added to supply to the solution sufficient water to convert all of the halide of the amphoteric metal to a hydrated compound. For example, if the halide of the amphoteric metal employed is tin tetrachloride and this is added to the rubber in an anhydrous condition the amount of 18° Baumé hydrochloric acid required to hydrate the tin tetrachloride will be approximately one-third of the weight of the tin tetrachloride. This supplies sufficient water to form $SnCl_4.3H_2O$. Somewhat less hydrochloric acid may be added without materially changing the nature of the reaction but it appears that substantially all of the tin tetrachloride should be combined with water to inhibit or prevent the action of the tin tetrachloride on the rubber until after the heating with hydrochloric acid has produced the desired change in the rubber solution. If a weaker hydrochloric acid solution is employed somewhat less is required. More hydrochloric acid may be added and it appears that any amount in excess of the minimum required may be employed, although by adding an excess of hydrochloric acid more water than required is added to the solution and eventually this water must be driven off before the reaction can be completed. In general it will be desirable to employ a more or less concentrated acid, such for example, as 18° Baumé. The reaction of the tin tetrachloride and the hydrochloric acid is so rapid, particularly at elevated temperatures, that the hydrochloric acid should be added before the tin tetrachloride or simultaneously with it. If the solution of rubber has been subjected to continued heating before the tin tetrachloride is added, the addition of hydrochloric acid may not be necessary, as explained in my copending application above referred to.

Instead of hydrochloric acid, other compounds such as the hydrogen halides, for example hydrobromic acid, may be used. Other halides of amphoteric metals may be employed. For example, iron chloride ($FeCl_3$) may be used. If the reaction with $FeCl_3$ is carried out using an unboiled solution of rubber the product produced is not soluble in gasoline unless some compound such as hydrochloric acid is added to the solution before it is boiled. With iron chloride a dark, almost ebony-colored product is obtained.

Some care must be exercised in carrying out the reaction, depending upon the metallic halide, etc. employed. For example, it is known that antimony salts react with benzene so that if a compound such as antimony pentachloride is used in carrying out the reaction some solvent other than benzene, such for example as carbon tetrachloride should be used. The invention is not limited to the use of such compounds as hydrochloric acid with the compounds here mentioned because hydrochloric acid has a beneficial effect in carrying out the reaction with different halides of amphoteric metals such as $BF_3$, $ZnCl_2$, $HgCl_2$, etc.

when sufficient water is present to prevent or inhibit the action of these compounds until the hydrochloric acid, etc., has produced some beneficial action on the rubber, the exact nature of which is not understood at the present time.

I claim:

1. The improvement in the method of producing a condensation derivative of rubber from a rubber solution by the action of the halide of an amphoteric metal which comprises utilizing aqueous hydrochloric acid and the halide of an amphoteric metal in the reaction, bringing the solution to a boil in the presence of the hydrochloric acid and at least a portion of the water, completing the action of the halide of the amphoteric metal after the solution has been brought to a boil, and having the hydrochloric acid in the reaction mixture at that stage of the heating at which the halide of the amphoteric metal would first react on the rubber if the hydrochloric acid were not present.

2. The improvement in the method of producing a condensation derivative of rubber from a rubber solution by the action of tin tetrachloride which comprises utilizing aqueous hydrochloric acid and tin tetrachloride in the reaction, bringing the solution to a boil in the presence of the hydrochloric acid and at least a portion of the water, completing the action of the tin tetrachloride after the solution has been brought to a boil, and having hydrochloric acid in the reaction mixture at that stage of the heating in which the tin tetrachloride would first react on the rubber if the hydrochloric acid were not present.

THOMAS C. MORRIS.